US012753360B2

(12) United States Patent
Pathem et al.

(10) Patent No.: US 12,753,360 B2
(45) Date of Patent: Oct. 6, 2026

(54) HIGH THERMAL STABILITY LUBRICANTS

(71) Applicant: Western Digital Technologies, Inc., San Jose, CA (US)

(72) Inventors: Bala Krishna Pathem, Fremont, CA (US); Robert James Waltman, Sunnyvale, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 380 days.

(21) Appl. No.: 17/220,836

(22) Filed: Apr. 1, 2021

(65) Prior Publication Data

US 2022/0154093 A1 May 19, 2022

Related U.S. Application Data

(60) Provisional application No. 63/115,586, filed on Nov. 18, 2020.

(51) Int. Cl.

*C10M 105/74* (2006.01)
*G11B 5/725* (2006.01)
(Continued)

(52) U.S. Cl.

CPC ......... *C10M 105/74* (2013.01); *G11B 5/7257* (2020.08); *G11B 5/7375* (2019.05); (Continued)

(58) Field of Classification Search

CPC .......... C10M 2213/00; C10M 2213/02; C10M 2213/023; C10M 2213/04; (Continued)

(56) References Cited

U.S. PATENT DOCUMENTS 6,099,937 A 8/2000 Gui et al.
6,731,446 B2 5/2004 Ikeda et al.
(Continued)

FOREIGN PATENT DOCUMENTS

CN 1831032 A 9/2006
CN 101121908 A 2/2008
(Continued)

OTHER PUBLICATIONS

International Search Report and Written Opinion for International Application No. PCT/US2021/041499, dated Sep. 9, 2021, 13 pages.
(Continued)

*Primary Examiner* — Holly Rickman
*Assistant Examiner* — Lisa Chau
(74) *Attorney, Agent, or Firm* — LOZA & LOZA, LLP; Gabriel Fitch

(57) ABSTRACT

A multidentate lubricant comprising an anchoring moiety Ra attached to a plurality of sidechain moieties —(Rb—Re) according to the general formula: Ra—(Rb—Re)$_x$; wherein Ra is a multivalent radical of valance x; and each sidechain includes a perfluoroethyl ether moiety. The lubricant can be used in conjunction with a magnetic recording medium and/or a magnetic data storage system.

20 Claims, 4 Drawing Sheets

(51) Int. Cl.

| | |
|---|---|
| ***G11B 5/73*** | (2006.01) |
| *C10N 20/04* | (2006.01) |
| *C10N 40/18* | (2006.01) |
| *G11B 5/00* | (2006.01) |
| *G11B 5/60* | (2006.01) |

(52) U.S. Cl.
CPC ... *C10M 2223/083* (2013.01); *C10N 2020/04* (2013.01); *C10N 2040/18* (2013.01); *G11B 2005/0021* (2013.01); *G11B 5/6082* (2013.01)

(58) Field of Classification Search
CPC ........ C10M 2213/043; C10M 2213/06; C10M 2213/0606; C10M 2213/062; C10M 2213/0623; C10M 107/38; G11B 5/725; C10N 2030/56; C10N 2040/18
See application file for complete search history.

(56) References Cited

U.S. PATENT DOCUMENTS

| | | | | |
|---|---|---|---|---|
| 7,715,302 | B2 | 5/2010 | Ohta et al. | |
| 8,178,480 | B2 | 5/2012 | Hamakubo et al. | |
| 8,787,130 | B1 | 7/2014 | Yuan et al. | |
| 9,117,475 | B2 | 8/2015 | Nakata et al. | |
| 9,382,496 | B1 | 7/2016 | Knigge et al. | |
| 9,466,322 | B2 | 10/2016 | Deng et al. | |
| 9,598,657 | B2 | 3/2017 | Isobe et al. | |
| 10,262,685 | B2 | 4/2019 | Pathem | |
| 10,373,632 | B2 | 8/2019 | Brand et al. | |
| 10,766,844 | B2 | 9/2020 | Valsecchi et al. | |
| 10,899,883 | B2 | 1/2021 | Galimberti et al. | |
| 10,947,476 | B2 | 3/2021 | Lu et al. | |
| 2002/0119316 | A1 | 8/2002 | Shukla et al. | |
| 2003/0176629 | A1 | 9/2003 | Blomquist et al. | |
| 2003/0181633 | A1 | 9/2003 | Blomquist et al. | |
| 2003/0185986 | A1 | 10/2003 | Ma et al. | |
| 2005/0031907 | A1 | 2/2005 | Matsuyama | |
| 2006/0229217 | A1 | 10/2006 | Liu et al. | |
| 2007/0060487 | A1 | 3/2007 | Burns et al. | |
| 2010/0035083 | A1 | 2/2010 | Yang et al. | |
| 2011/0117386 | A1 | 5/2011 | Li et al. | |
| 2012/0097194 | A1 | 4/2012 | Mcdaniel et al. | |
| 2012/0219826 | A1 | 8/2012 | Li et al. | |
| 2012/0251843 | A1* | 10/2012 | Yan | C08L 71/02 428/800 |
| 2013/0161181 | A1 | 6/2013 | Guo et al. | |
| 2014/0234666 | A1 | 8/2014 | Knigge et al. | |
| 2015/0235664 | A1 | 8/2015 | Deng et al. | |
| 2015/0275352 | A1 | 10/2015 | Ng et al. | |
| 2015/0361212 | A1 | 12/2015 | Takahashi et al. | |
| 2016/0068778 | A1* | 3/2016 | Conley | G11B 5/8408 427/127 |
| 2016/0260452 | A1 | 9/2016 | Pathem | |
| 2016/0329074 | A1 | 11/2016 | Karis et al. | |
| 2017/0081266 | A1* | 3/2017 | Valsecchi | C10M 131/10 |
| 2017/0260472 | A1 | 9/2017 | Sagata et al. | |
| 2018/0233167 | A1 | 8/2018 | Sakane et al. | |
| 2018/0268853 | A1 | 9/2018 | Shimokawa et al. | |
| 2019/0352573 | A1 | 11/2019 | Hatta et al. | |
| 2020/0010619 | A1* | 1/2020 | Minami | C08G 59/1438 |
| 2022/0220406 | A1 | 7/2022 | Pathem et al. | |
| 2022/0282176 | A1 | 9/2022 | He et al. | |
| 2022/0290066 | A1 | 9/2022 | He et al. | |
| 2022/0364008 | A1 | 11/2022 | Pathem et al. | |

FOREIGN PATENT DOCUMENTS

| | | | | |
|---|---|---|---|---|
| CN | 103237831 | A | 8/2013 | |
| CN | 106661489 | A | 5/2017 | |
| CN | 110366575 | A | 10/2019 | |
| EP | 3555174 | A1 | 10/2019 | |
| JP | 2007193924 | A | 8/2007 | |
| JP | 4654339 | B2 | 3/2011 | |
| JP | 2014509677 | A | 4/2014 | |
| JP | 2017521478 | A | 8/2017 | |
| JP | 2017530221 | A | 10/2017 | |
| JP | 7502436 | B2 | 6/2024 | |
| KR | 20100067037 | A | 6/2010 | |
| WO | 2015/182321 | A1 | 12/2015 | |
| WO | 2017/099075 | A1 | 6/2017 | |
| WO | WO-2018159232 | A1 * | 9/2018 | C08G 59/04 |
| WO | 2021002178 | A1 | 1/2021 | |

OTHER PUBLICATIONS

International Search Report and Written Opinion for International Application No. PCT/US2021/041500, dated Sep. 14, 2021, 15 pages.

Brunner, Ralf, "Properties of Carbon Overcoats and Perfluoro-Polyether Lubricants in Hard Disk Drives"; Ph.D Dissertation; University of California, San Diego; 2009; https://escholarship.org/uc/item/24w0q2v0; 248 pages.

Guo et al., "A multidentate lubricant for use in hard disk drives at sub-nanometer thickness"; Journal of Applied Physics, 2012; https://aip.scitation.org/doi/10.1063/1.3677984; 8 pages.

Guo et al., "Multidentate functionalized lubricant for ultralow head/disk spacing in a disk drive"; Journal of Applied Physics; 2006; https://www.researchgate.net/publication/252269467_Multidentate_functionalized_lubricant_for_ultralow_headdisk_spacing_in_a_disk_drive; 9 bages.

Marchon et al., "Fomblin Multidentate Lubricants for Ultra-Low Magnetic Spacing"; IEEE Transactions on Magnetics; vol. 42, No. 10; Oct. 2006; https://ieeexplore.ieee.org/document/1704346; 4 pages.

Marchon, Bruno, "Lubricant Design Attributes for Subnanometer Head-Disk Clearance"; IEEE Transactions on Magnetics; vol. 45, No. 2; Feb. 2009; https://ieeexplore.ieee.org/document/4782079?reload=true; 6 pages.

Rhew et al., "Thermal Stability of Modified Perfluoropolyether Lubricants for Application in Heat Assisted Magnetic Recording"; Proceedings of the ASME/STLE 2011 International Joint Tribology Conference; 2011; https://doi.org/10.1115/IJTC2011-61044; 2 pages.

Jones et al., "Laser-Induced Thermo-Desorption of Perfluoropolyether Lubricant from the Surface of a Heat-Assisted Magnetic Recording Disk: Lubricant Evaporation and Diffusion"; ResearchGate; Jul. 1, 2015; https://www.researchgate.net/publication/281528079_Laser-Induced_Thermo-Desorption_of_Perfluoropolyether_Lubricant_from_the_Surface_of_a_Heat-Assisted_Magnetic_Recording_Disk_Lubricant_Evaporation_and_Diffusion; 7 pages.

Wu, Lin, "Modelling and simulation of the lubricant depletion process induced by laser heating in heat-assisted magnetic recording system"; IOP Publishing: Nanotechnology; vol. 18, No. 21; Apr. 27, 2007; https://iopscience.iop.org/article/10.1088/0957-4484/18/21/215702/pdf, 9 pages.

Zhang et al., "Lubrication for Heat-Assisted Magnetic Recording Media"; IEEE Transactions on Magnetics; vol. 42, Issue 10, Oct. 2006; https://ieeexplore.ieee.org/document/1704360; 3 pages.

Yoshino, K., "The Surprisingly Unknown Difference Between Molecular Weight and Mass Units", Biotechnology, 2013, vol. 91, No. 8, pp. 464-468.

* cited by examiner

HIGH THERMAL STABILITY LUBRICANTS

CROSS-REFERENCE TO RELATED APPLICATIONS

This application claims priority to and the benefit of U.S. Provisional Patent Application No. 63/115,586, filed on Nov. 18, 2020 entitled, "HIGH THERMAL STABILITY LUBRICANTS," the entire content of which is incorporated herein by reference.

FIELD

The disclosure relates to lubricants, and more particularly, to high thermal stability lubricants, which may be used for magnetic recording, e.g., for Heat Assisted Magnetic Recording (HAMR) magnetic media.

INTRODUCTION

Magnetic storage systems, such as a hard disk drive (HDD), are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks generally include two main components, namely, a substrate material that gives it structure and rigidity, and a magnetic media coating that stores the magnetic impulses or moments that represent data in a recording layer within the coating. The typical disk drive also includes a read head and a write head, generally in the form of a magnetic transducer which can sense and/or change the magnetic fields stored on the recording layer of the disks. HAMR is a recording technique that can increase the areal density (AD) of written data on a magnetic storage medium having high coercivity using high recording temperatures to write information to the medium. However, the high recording temperatures applied to the media may present challenges. Other examples of magnetic storage media include flexible tape media usable for magnetic tape recording. As a result of the high temperatures associated with HAMR, suitable lubricants for use in HAMR drives may benefit from relatively high thermal stability. As such, there is a need in the art for lubricants having high thermal stability and other properties for use in HAMR drives.

SUMMARY

In one aspect, this disclosure provides a lubricant including a multidentate lubricant comprising an anchoring moiety Ra attached to a plurality of sidechain moieties —(Rb—Re) according to the general formula:

$$Ra—(Rb—Re)_x;$$

wherein Ra is a multivalent radical of valance x;

wherein each Rb is, independently, a divalent moiety comprising the general formula:

$$—OCH_2CF_2O—(CF_2CF_2O)_b—C(R^{\#})_2CH_2—;$$

wherein each $R^{\#}$ is, independently, a hydrogen or a fluorine atom;

wherein each b is, independently, from 1 to 10;

wherein x is greater than or equal to 2; and wherein each Re is, independently, a hydroxyl (—OH) or a functional group including elements from Group 13-17 of the periodic table of the elements.

In one aspect, this disclosure provides a magnetic recording medium including a magnetic recording layer on a non-magnetic substrate; a protective overcoat on the magnetic recording layer; and a lubricant layer on the protective overcoat, the lubricant comprising a multidentate lubricant comprising an anchoring moiety Ra attached to a plurality of sidechain moieties —(Rb—Re) according to the general formula:

$$Ra—(Rb—Re)_x;$$

wherein Ra is a multivalent radical of valance x;

wherein each Rb is, independently, a divalent moiety comprising the general formula:

$$—OCH_2CF_2O—(CF_2CF_2O)_b—C(R^{\#})_2CH_2—;$$

wherein each $R^{\#}$ is, independently, a hydrogen or a fluorine atom;

wherein each b is, independently, from 1 to 10;

wherein x is greater than or equal to 2; and wherein each Re is, independently, a hydroxyl (—OH) or a functional group including elements from Group 13-17 of the periodic table of the elements.

In one aspect, this disclosure also provides a data storage system including a magnetic head; a magnetic recording medium according to any one or more aspects disclosed herein, a drive mechanism for positioning the magnetic head over the magnetic recording medium; and a controller electrically coupled to the magnetic head for controlling operation of the magnetic head.

Other aspects and advantages of the present disclosure will become apparent from the following detailed description, when considered in conjunction with the drawings.

DETAILED DESCRIPTION

Figure 1:
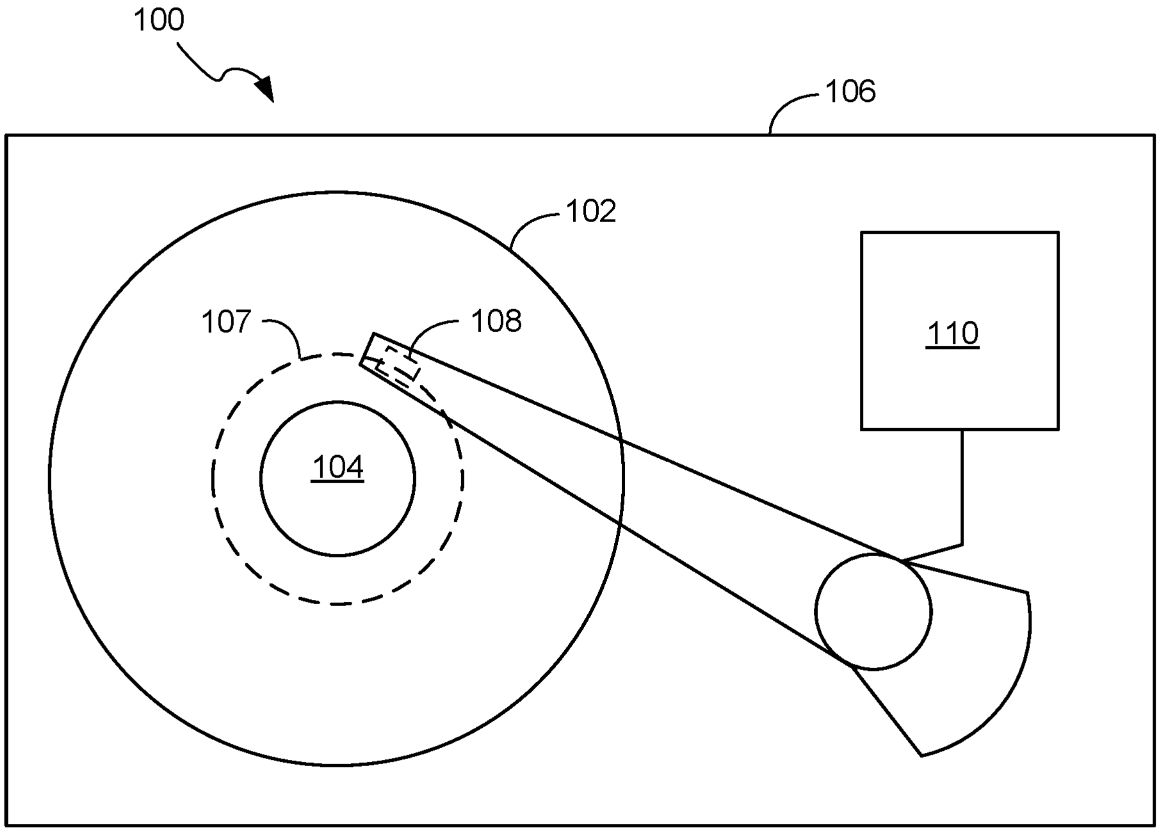
FIG. 1 is a diagram schematically illustrating a data storage device including a slider and a magnetic recording medium in accordance with one aspect of the disclosure.

Heat Assisted Magnetic Recording (HAMR) systems operate at substantially higher temperatures than traditional magnetic recording systems. HAMR is an example of magnetic recording within the class of Energy Assisted Magnetic Recording (EAMR) techniques, where conventional magnetic recording is supplemented by other energy used in the system. Other examples of EAMR may include Microwave Assisted Magnetic Recording (MAMR) and applications of current into various conductive and/or magnetic structures near the main pole. This disclosure is generally directed to a lubricant having high thermal stability that can be used in conjunction with a magnetic recording medium and/or a magnetic data storage system including a HAMR, or more generally EAMR, magnetic recording medium or storage system. In one aspect, the lubricant may include a multi-dentate lubricant comprising a polyvalent anchoring moiety to which a plurality of sidechain moieties may be attached. In some aspects of the disclosure, each of the sidechains include a perfluoroethyl ether moiety. The lubricant provides improved levels of head wear, lube pickup, and improved contamination robustness when compared with lubricants known in the art.

Definitions

For purposes herein, and the claims thereto, the new numbering scheme for the Periodic Table Groups is used as described in Chemical and Engineering News, 63(5), pg. 27 (1985). Therefore, a "group 4 metal" is an element from group 4 of the Periodic Table, e.g. Hf, Ti, or Zr.

As used herein, and unless otherwise specified, the term "Ce" means hydrocarbon(s) having n carbon atom(s) per molecule, where n is a positive integer. Likewise, a "$C_m$-$C_y$" group or compound refers to a group or compound comprising carbon atoms at a total number thereof in the range from m to y. Thus, a $C_1$-$C_4$ alkyl group refers to an alkyl group that includes carbon atoms at a total number thereof in the range of 1 to 4, e.g., 1, 2, 3 and 4.

"Moiety" refers to one or more covalently bonded atoms which form a part of a molecule. The terms "group," "radical," "moiety", and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{20}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

For purposes herein, a heteroatom is any non-carbon atom, selected from groups 13 through 17 of the periodic table of the elements. In one or more aspects, heteroatoms are non-metallic atoms selected from B, N, O, Si, P, S, As Se, Te and the halogens F, Cl, Br, I, and At.

Unless otherwise indicated, the term "substituted" means that at least one hydrogen atom has been replaced with at least one non-hydrogen atom or a functional group.

For purposes herein, a functional group includes one or more of a hydrocarbyl group, a heteroatom, or a heteroatom containing group, such as halogen (such as Br, Cl, F or I) or at least one functional group such as —$NR^*_2$, —NR*—CO—R*, —OR*, *—O—CO—R*, —CO—O—R*, —SeR*, —TeR*, —$PR^*_2$, —PO—$(OR^*)_2$, —O—PO—$(OR^*)_2$, —$AsR^*_2$, —$SbR^*_2$, —SR*, —$SO_2$—$(OR^*)_2$, —$BR^*_2$, —$SiR^*_3$, —$(CH_2)$q-$SiR^*_3$, or a combination thereof, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring.

In one or more aspects, functional groups may include: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, —$NR^*_2$, —NR*—CO—R*, —OR*, —O—CO—R*, —CO—O—R*, —SeR*, —TeR*, —$PR^*_2$, —PO—$(OR^*)_2$, —O—PO—$(OR^*)_2$, —N═P$(NR^*_2)_3$, —$AsR^*_2$, —SR*, —$SO_2$—$(OR^*)_2$, —$BR^*_2$, —$SiR^*_3$, —$(CH_2)$q-$SiR^*_3$, —$(CF_2)$q-$SiR^*_3$, or a combination thereof, wherein q is 1 to 10 and each R* is, independently a hydrogen, a halogen, a saturated, unsaturated, aromatic, and/or heterocyclic $C_1$-$C_{20}$ radical.

For purposes as described herein, a functional group which is attachable to a surface of a magnetic recording medium may refer to a functional group having increased affinity for that surface relative to the affinity of perfluroalkylethers to that same surface. Increased affinity may include Van der Waals forces, weak London Dispersion forces, dipole-dipole forces, and/or the like, and/or one or more types of bonds and/or dative bonds with the surface of the magnetic recording media, preferably with a protective overcoat of a recording media. In one or more aspects, a functional group which is attachable to a surface of a magnetic recording medium refers to one or more functional groups having increased affinity for the carbon overcoat (COC) layer of the recording media, relative to the affinity of perfluroalkylethers to that same surface.

A heterocyclic ring, also referred to herein as a heterocyclic radical, is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring. A substituted heterocyclic ring is a heterocyclic ring where a hydrogen of one of the ring atoms is substituted, e.g., replaced with a hydrocarbyl, or a heteroatom containing group.

A "compound" refers to a substance formed by the chemical bonding of a plurality chemical elements. A "derivative" refers to a compound in which one or more of the atoms or functional groups of a precursor compound have been replaced by another atom or functional group, generally by means of a chemical reaction having one or more steps.

An "anchoring moiety" refers to a structure (a chemical moiety) to which the sidechain moieties are bonded in order to form the present lubricant molecules.

"Side chain" refers to a chemical moiety that is chemically bonded to the anchor moiety and includes an intermediate moiety Rb terminated by a termination or end moiety Re.

The "end group," abbreviated Re, refers to a mono-valent radical in the form of an atom or functional group located at an end of a chain molecule or moiety.

"Perfluoropolyether" refer to alkyl ethers in which one or more hydrogen atoms are substituted with fluorine. In one aspect, all or a majority of alkyl hydrogen atoms are substituted with fluorine in PFPE molecules. PFPE molecules are also sometimes referred to as perfluoroalkylether (PFAE) or perfluoropolyalkylether (PFPAE) molecules.

"Perfluoropolyether moiety" refers to moieties comprising perfluoropolyether (PFPE) molecules Rb. Perfluoropolyether moieties are bonded to an anchoring moiety Ra as part of the side chains in the present molecules.

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

As used herein, the term "aromatic" also refers to pseudo-aromatic heterocycles which are heterocyclic substituents that have similar properties and structures (nearly planar) to aromatic heterocyclic ligands, but are not by definition aromatic; likewise the term aromatic also refers to substituted aromatics.

As used herein, a moiety which is chemically identical to another moiety is defined as being identical in overall composition exclusive of isotopic abundance and/or distribution, and/or exclusive of stereochemical arrangement such as optical isomers, confirmational isomers, spatial isomers, and/or the like.

HAMR System for Employing Lubricant

FIG. 1 is a top schematic view of a data storage device 100 (e.g., disk drive or magnetic recording device) configured for heat assisted magnetic recording (HAMR) including a slider 108 and a magnetic recording medium 102 having a lubricant according to one or more aspects of the disclosure. The laser (not visible in FIG. 1 but see 114 in FIG. 2) is positioned with a head/slider 108. Disk drive 100 may include one or more disks/media 102 to store data. Disk/media 102 resides on a spindle assembly 104 that is mounted to a drive housing. Data may be stored along tracks in the magnetic recording layer of disk 102. The reading and writing of data is accomplished with the head 108 (slider) that may have both read and write elements (108*a* and 108*b*). The write element 108*a* is used to alter the properties of the magnetic recording layer of disk 102 and thereby write information thereto. In one aspect, head 108 may have magneto-resistive (MR), giant magneto-resistive (GMR), or tunnel magneto-resistive (TMR) elements. In an alternative aspect, head 108 may be another type of head, for example, a Hall effect head. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an example HAMR system is shown, the various embodiments described may be used in other EAMR or non-EAMR magnetic data recording systems, including perpendicular magnetic recording (PMR) disk drives or magnetic tape drives.

Figure 2:
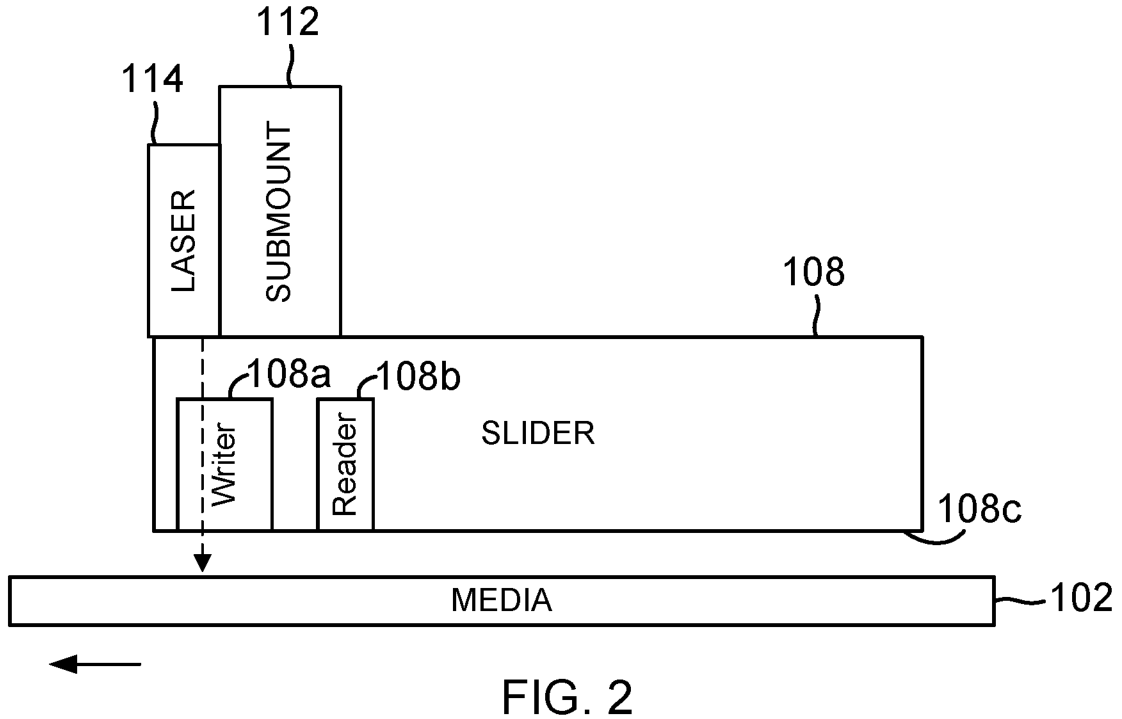
FIG. 2 is a side schematic view of the slider and magnetic recording medium of FIG. 1 in accordance with one aspect of the disclosure.

FIG. 2 is a side schematic view of the slider 108 and magnetic recording medium 102 of FIG. 1. The magnetic recording medium 102 includes a lubricant layer (see FIG. 3) in accordance with one or more aspects of the disclosure. The slider 108 may include a sub-mount 112 attached to a top surface of the slider 108. The laser 114 may be attached to the sub-mount 112, and possibly to the slider 108. The slider 108 includes a write element (e.g., writer) 108*a* and a read element (e.g., reader) 108*b* positioned along an air bearing surface (ABS) 108*c* of the slider for writing information to, and reading information from, respectively, the media 102. In other aspects, the slider may also include a layer of the lubricant (not shown).

In operation, the laser 114 is configured to generate and direct light energy to a waveguide (possibly along the dashed line) in the slider which directs the light to a near field transducer (NFT) near the air bearing surface (e.g., bottom surface) 108*c* of the slider 108. Upon receiving the light from the laser 114 via the waveguide, the NFT generates localized heat energy that heats a portion of the media 102 near the write element 108*a* and the read element 108*b*. The anticipated recording temperature is in the range of about 350° C. to 400° C. In the aspect illustrated in FIG. 2, the laser directed light is disposed within the writer 108*a* and near a trailing edge of the slider. In other aspects, the laser directed light may instead be positioned between the writer 108*a* and the reader 108*b*. FIGS. 1 and 2 illustrate a specific aspect of a HAMR system. In other aspects, the magnetic recording medium 102 with the lubricant layer according to aspects of the disclosure can be used in other suitable HAMR systems (e.g., with other sliders configured for HAMR).

Figure 3:
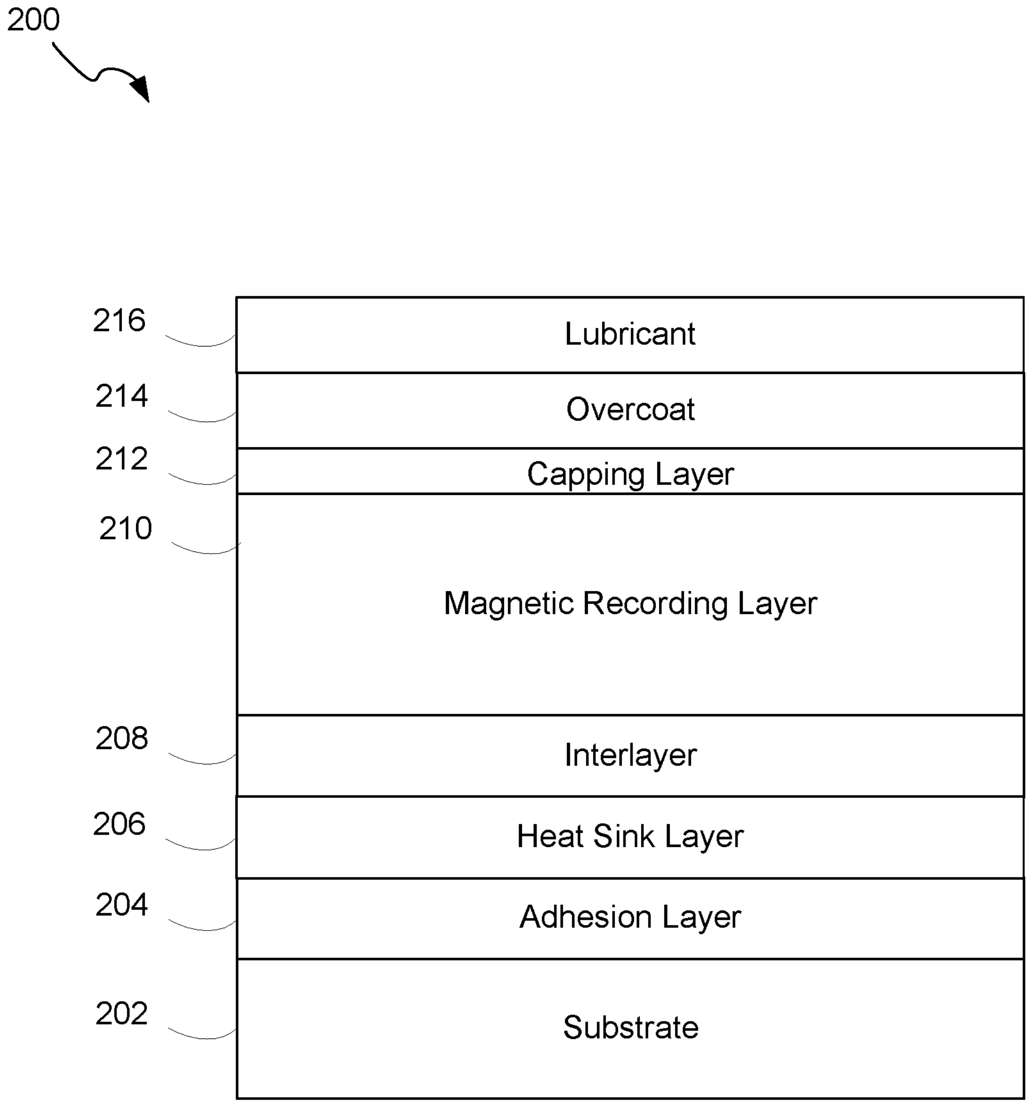
FIG. 3 is a side schematic view of a head assisted magnetic recording (HAMR) medium in accordance with one aspect of the disclosure.

FIG. 3 is a side schematic view of a magnetic recording medium 200 having a lubricant layer according to one or more aspects of the disclosure. In one aspect, the magnetic recording medium 200 may be used in a HAMR system (e.g., disk drive 100). The magnetic recording medium 200 has a stacked structure with a substrate 202 at a bottom/base layer, an adhesion layer 204 on the substrate 202, a heat sink layer 206 on the adhesion layer 204, an interlayer 208 on the heat sink layer 206, a magnetic recording layer (MRL) 210 on the interlayer 208, a capping layer 212 on the MRL 210, an overcoat layer 214 on the capping layer 212, and a lubricant layer 216 on the overcoat layer 214. In one aspect, the magnetic recording medium 200 may have a soft magnetic underlayer (SUL) between the adhesion layer 204 and the heat sink layer 206. In one aspect, the magnetic recording medium 200 may have a thermal resistance layer (TRL) between the interlayer 208 and the heat sink layer 206. In one aspect, for disk drive applications, the substrate 202 can be made of one or more materials such as an Al alloy, NiP plated Al, glass, glass ceramic, and/or combinations thereof. In one aspect for magnetic tape recording applications, the substrate 202 can include a flexible material, such a film made of one of various types of resins, polyesters, polyolefins, polyamides, and the like, or combinations thereof. The substrate may include non-magnetic materials, and may be laminated. In some aspects, the magnetic recording medium 200 may have some or all of the layers illustrated in FIG. 3 and/or additional layer(s) in various stacking orders. It should also be noted that each layer shown in FIG. 3 may include one or more sub-layers. For example, the magnetic recording layer may comprise a multiple layers in certain embodiments.

Lubricants suitable for use according to aspects disclosed herein may function as boundary lubricants which may be used in various mechanical devices, including magnetic hard disk drives or tape drives and other microelectronic mechanical systems. Boundary lubricants may form a lubricant layer when one or more functional groups of the lubricant attach or otherwise engage with the surface being lubricated. For instance, one or more boundary lubricants may form the lubricant layer 216 on magnetic recording medium 200 (e.g. a disk that includes a magnetic recording layer 210) that moves relative to other parts in the mechanical device. This lubricant layer 216 may help to protect the magnetic recording medium from frictional wear and/or damage caused by interactions between the magnetic recording medium and other parts in the mechanical device (e.g. interactions between a slider and the magnetic recording medium). In other words, this boundary layer may help limit solid-to-solid contact.

Lubricant Characteristics

Figure 4:
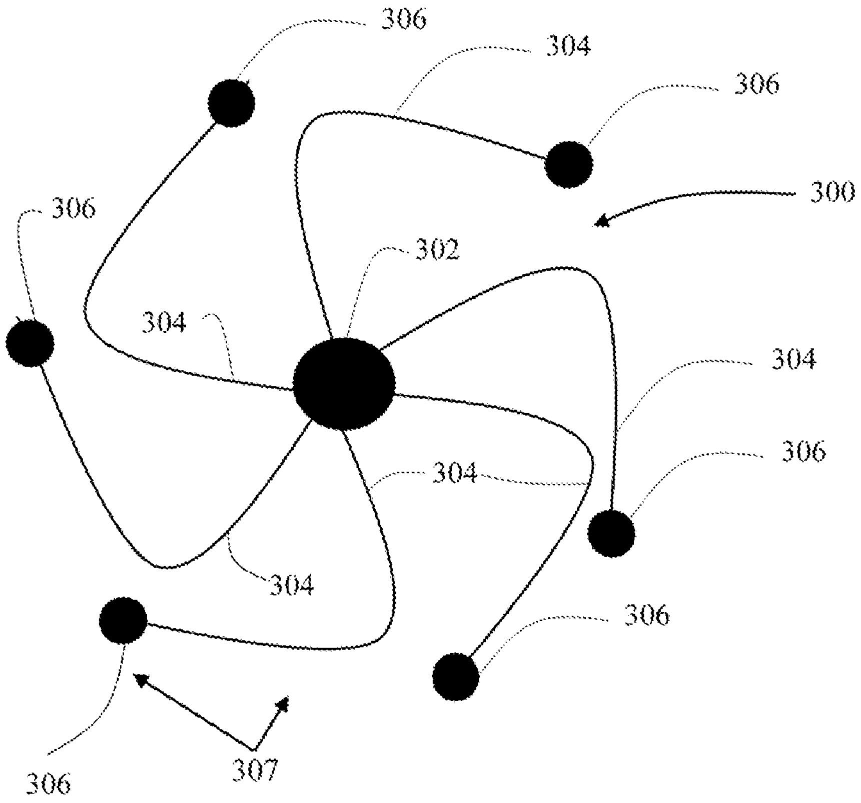
FIG. 4 is a schematic drawing showing a lubricant according to aspects disclosed herein.

FIG. 4 illustrates a boundary lubricant 300, according to one aspect of the disclosure. As shown in FIG. 4, the boundary lubricant 300 includes an anchor moiety Ra 302, which in one aspect is a polyvalent cyclic moiety, and a plurality of sidechains each of which include an intermediate or linking segment 304 bonded with, and located between the anchor moiety 302 and, an attachment segment 306 positioned on a terminal end of the linking segment 304. The sidechain, generally indicated as 307, includes the combination of the linking segment 304 and the attachment segment 306. In one aspect, the attachment segment 306 has a higher affinity for the substrate, e.g., the protective overcoat layer, than does the linking segment 304.

In some aspects, each of the linking segments 304 include a perfluoroethyl ether moiety —$(CF_2CF_2O)_b$— where b is from 1 to 10. The anchor segment Ra 302 may also be an attachment segment e.g., include a functional group, along with the end groups Re (306), which are preferably selected to or configured to attach to a surface to be lubricated.

In one aspect, the lubricant comprises a multidentate lubricant having an anchoring moiety Ra attached to a plurality of sidechain moieties —(Rb—Re) according to the general formula:

$$Ra—(Rb—Re)_x;$$

wherein Ra is a multivalent radical of valance x; each Rb comprises a perfluoroethyl ether having the general formula:

$$—(CF_2CF_2O)_b—;$$

wherein each b is, independently from 1 to 10; x is greater than or equal to 2, preferably x is greater than or equal to 3.

In some aspects, the lubricant comprises a multidentate lubricant having an anchoring moiety Ra attached to a plurality of sidechain moieties —(Rb—Re) according to the general formula:

$$Ra—(Rb—Re)_x;$$

wherein Ra is a multivalent radical of valance x; each Rb is, independently, a divalent moiety having the general formula:

$$—OCH_2CF_2O—(CF_2CF_2O)_b—C(R^\#)_2CH_2—;$$

wherein each $R^\#$ is, independently, a hydrogen or a fluorine atom; each b is, independently from 1 to 10; x is greater than or equal to 2; and each Re is, independently, a hydroxyl (—OH) or a functional group including elements from Group 13-17 of the periodic table of the elements. In other aspects, x is greater than or equal to 3, or x is greater than or equal to 4, or x is greater than or equal to 5, or x is greater than or equal to 6, or x is greater than or equal to 7, or x is greater than or equal to 8.

In some aspects, each functional group includes, independently, a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, $—NR^*_2$, —NR*—CO—R*, —OR*, —O—CO—R*, —CO—O—R*, —SeR*, —TeR*, $—PR^*_2$, $—PO—(OR^*)_2$, $—O—PO—(OR^*)_2$, $—N{=}P(NR^*_2)_3$, $—AsR^*_2$, —SR*, $—SO_2—(OR^*)_2$, $—BR^*_2$, $—SiR^*_3$, $—(CH_2)q\text{-}SiR^*_3$, $—(CF_2)q\text{-}SiR^*_3$, or a combination thereof, wherein q is 1 to 10 and each R* is, independently a hydrogen, a halogen, a saturated, unsaturated, aromatic, and/or heterocyclic $C_1$-$C_{20}$ radical, and wherein two or more R* may join together to form a ring structure, and wherein each functional group is selected to be attachable to a surface of a magnetic recording medium.

In one aspect, at least one end group Re is a hydroxyl. In other aspects, each of the end groups Re present is a hydroxyl. In still other aspects, each of the end groups Re comprises at least one oxygen atom.

In some aspects, a weight average molecular weight of two or more of the sidechains —(Rb—Re) are equal. Accordingly, in some aspects, the number of perfluoro moieties is the same in each of the sidechains and at least one of the end groups Re is different from another. In other aspects, the number of perfluoro moieties in at least one sidechain is different from another sidechain, yet the composition of the end groups results in the weight average molecular weight of two or more of the sidechains being equal. In other aspects, each of the sidechains —(Rb—Re) are chemically identical.

In one or more aspects, the number of moieties "b" in each of the sidechains is from 1 to 10, or from 2 to 8, or from 3 to 7, or from 4 to 6. In one or more aspects, the end groups Re are selected to be attachable to the protective overcoat (e.g., the carbon overcoat or COC layer) of a recording media. In some aspects, the end groups are alcohols, (e.g., hydroxyls —OH).

In one or more aspects, Ra is a $C_1$-$C_{20}$ radical, an unsaturated $C_1$-$C_{20}$ radical, an alicyclic $C_3$-$C_{20}$ radical, a heterocyclic $C_2$-$C_{20}$ radical, an aromatic $C_6$-$C_{20}$ radical, a heteroaromatic $C_5$-$C_{20}$ radical, a cyclotriphosphazine radical, or a combination thereof. In one aspect, Ra is a polyvalent cyclic radical. In some aspects, x is greater than or equal to 2. In other aspects, x is greater than or equal to 3, or x is greater than or equal to 4, or x is greater than or equal to 5, or x is greater than or equal to 6. In one or more aspects, Ra is selected to be attachable to a surface of a magnetic recording medium and/or Ra is substituted with functional groups, at least one of which is selected to be attachable to a surface of a magnetic recording medium. In one or more aspects, Ra is at least a trivalent radical, which in one or more aspects comprises at least one aromatic or heteroaromatic ring system. As such, the anchoring moiety Ra may be selected to be attachable to surface of a magnetic recording medium, e.g., it may be mono-dentate or multi-dentate in and of itself.

Examples of suitable anchoring groups Ra include both substituted and unsubstituted analogs of borirene, cyclopropenone, furan, pyrrole, imidazole, thiophene, phosphole, pyrazole, oxazole, isoxazole, thiazole, triazole, tetrazole, pentazole, benzene, pyridine, pyrazine, pyrimidine, pyridazine, triazine, tetrazine, pentazine, hexazine, borepin, tropone, azonine, cyclooctadecanonaene, diazapentalene, thienothiophene, trithiapentalene, benzofuran, isobenzofuran, indole, isoindole, benzothiophene, benzo(c)thiophene, benzophosphole, benzimidazole, purine, indazole, benzoxazole, benzisoxazole, benzothiazole, 5-aza-7-deazapurine, naphthalene, quinoline, isoquinoline, quinoxaline, quinazoline, cinnoline, phthalazine, azulene, combinations thereof, and/or the like.

In one or more aspects, the lubricant has the general formula:

$$R_a\!\left(—O—CH_2CF_2O(CF_2CF_2O)_b—CF_2CH_2OH\right)_x$$

wherein each b is, independently from 1 to 10 and x is greater than or equal to 2, or x greater than or equal to 3.

In other aspects, the lubricant has the general formula:

$$R_a\text{-}(\text{-}O\text{—}CH_2CF_2O(CF_2CF_2O)_b\text{—}CF_2CH_2OH)_x$$

wherein each b is, independently, from 1 to 10 and x is greater than or equal to 2, or x greater than or equal to 3.

In one aspect, Ra is a cyclic polyvalent radical. In one or more aspects, Ra is represented by the formula:

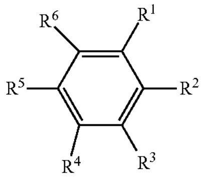

wherein each of $R^1$, $R^2$, $R^3$, $R^4$, $R^5$, and $R^6$, is, independently, a hydrogen or a functional group including elements from Group 13-17 of the periodic table of the elements, subject to the proviso that two or more of $R^1$, $R^2$, $R^3$, $R^4$, $R^5$, and $R^6$, are, independently, a sidechain having the formula:

—(Rb—Re)

as defined above. In some of such aspects, two or more of $R^1$, $R^2$, $R^3$, $R^4$, $R^5$, and $R^6$, include a functional group including: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, —$NR^*_2$, —NR*—CO—R*, —OR*, —O—CO—R*, —CO—O—R*, —SeR*, —TeR*, —$PR^*_2$, —PO—$(OR^*)_2$, —O—PO—$(OR^*)_2$, —N═P$(NR^*_2)_3$, —$AsR^*_2$, —SR*, —$SO_2$—$(OR^*)_2$, —$BR^*_2$, —$SiR^*_3$, —$(CH_2)$q-$SiR^*_3$, —$(CF_2)$q-$SiR^*_3$, or a combination thereof, wherein q is 1 to 10 and each R* is, independently a hydrogen, a halogen, a saturated, unsaturated, aromatic, and/or heterocyclic $C_1$-$C_{20}$ radical, and wherein two or more R*, and/or two or more of $R^1$, $R^2$, $R^3$, $R^4$, $R^5$, and $R^6$, may join together to form a ring structure. In one or more aspects, at least one functional group is selected to be attachable to a surface of a magnetic recording medium. In some of such aspects, two or more of $R^1$, $R^2$, $R^3$, $R^4$, $R^5$, and $R^6$ join together to form a $C_5$-$C_{20}$ aromatic ring structure, a $C_5$-$C_{20}$ heteroaromatic ring structure, or a combination thereof. In one aspect, two or more of $R^1$, $R^2$, $R^3$, $R^4$, $R^5$, and $R^6$ join together to form a $C_5$-$C_{20}$ aromatic ring structure, a $C_5$-$C_{20}$ heteroaromatic ring structure, or a combination thereof, which is further substituted with one or more sidechain moieties having the formula: —(Rb—Re) as defined above.

Suitable examples include:

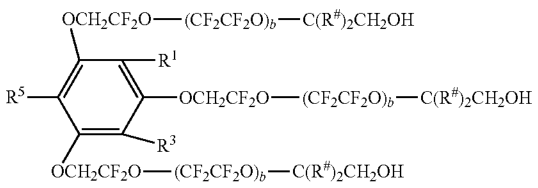

wherein each $R^{\#}$ is, independently, a hydrogen or a fluorine atom; wherein $R^1$, $R^3$, and $R^5$ may be hydrogen, or may each include one or more functional groups including: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, —$NR^*_2$, —NR*—CO—R*, —OR*, —O—CO—R*, —CO—O—R*, —SeR*, —TeR*, —$PR^*_2$, —PO—$(OR^*)_2$, —O—PO—$(OR^*)_2$, —N═P$(NR^*_2)_3$, —$AsR^*_2$, —SR*, —$SO_2$—$(OR^*)_2$, —$BR^*_2$, —$SiR^*_3$, —$(CH_2)$q-$SiR^*_3$, —$(CF_2)$q-$SiR^*_3$, or a combination thereof, wherein q is 1 to 10 and each R* is, independently a hydrogen, a halogen, a saturated, unsaturated, aromatic, and/or heterocyclic $C_1$-$C_{20}$ radical, and wherein two or more R*, and/or two or more of $R^1$, $R^3$, and $R^5$ may join together to form a ring structure, and wherein at least one functional group is selected to be attachable to a surface of a magnetic recording medium. In one or more aspects, the lubricant is tridentate, tetradentate, pentadentate, hexadentate, septedentate, octadentate, or higher.

In one or more aspects, each of the sidechains —(Rb—Re) independently has the formula:

$$\text{—}OCH_2CF_2O\text{—}(CF_2CF_2O)_b\text{—}C(R^{\#})_2CH_2OH;$$

wherein each $R^{\#}$ is, independently, a hydrogen or a fluorine atom; and each b is, independently from 1 to 10. In some of such aspects, each $R^{\#}$ is hydrogen. In other of such aspects, each $R^{\#}$ is fluorine.

In some aspects of the lubricant, $R_a$ is represented by the formula:

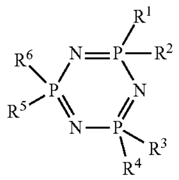

wherein each of $R^1$, $R^2$, $R^3$, $R^4$, $R^5$, and $R^6$, is, independently, a hydrogen or a functional group including elements from Group 13-17 of the periodic table of the elements, subject to the proviso that two or more of $R^1$, $R^2$, $R^3$, $R^4$, $R^5$, and $R^6$, are, independently, a sidechain having the formula:

—(Rb—Re).

In one or more aspects, each of the sidechains independently has the formula:

$$\text{—}OCH_2CF_2O\text{—}(CF_2CF_2O)_b\text{—}C(R^{\#})_2CH_2OH;$$

wherein each $R^{\#}$ is, independently, a hydrogen or a fluorine atom; and each b is, independently from 1 to 10. Suitable examples include:

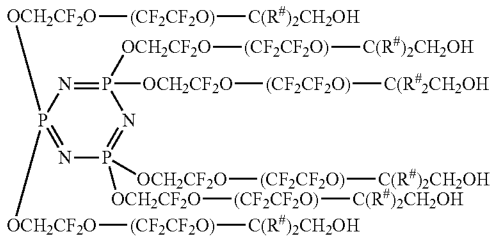

wherein each R# is, independently, a hydrogen or a fluorine atom.

In one or more aspects, the lubricant has a weight average molecular weight of greater than or equal to about 1 kilo-Dalton (kDa), or from about 1 to about 20 kDa, or from about 2 to about 10 kDa, or from about 3 to about 7 kDa, or from about 1 to about 5 kDa, or 2 to about 4 kDa. In one or more aspects, the lubricants are essentially pure compounds, having a polydispersity, defined as the number average molecular weight Mn divided by the weight average molecular weight Mw (Mn/Mw) from about 1 to 2, or from about 1 to about 1.5.

Applicant has discovered that a relatively high molecular weight, e.g., greater than or equal to about 1000 atomic mass units (amu), or preferably greater than or equal to about 3000 amu, is less prone to evaporation, which is of particular importance under the relatively high temperature conditions of HAMR drives. Conventional lubricants having a long, high MW main chain segment tethered to a surface at both ends by individual attachment segments have multiple degrees of freedom that may allow a portion (e.g. a middle portion) of the main chain segment to lift up from the surface and interact with a magnetic head positioned above. However, decreasing the molecular weight of the single main chain segment to achieve an improved head-disk clearance margin results in evaporation issues, as molecular weight inversely and exponentially varies with vapor pressure.

Likewise, merely decreasing the molecular weight of the single main chain segment may also decrease the effective viscosity of the lubricant, which has a linear, inverse relationship with molecular weight, leading to possible spin-off issues. In contrast, aspects of the instant disclosure present lubricants of relatively high molecular weight without such issues.

Returning to FIG. 3, in one or more aspects, the magnetic recording medium 200 has a stacked structure which includes a lubricant layer 216 on the overcoat layer 214. The lubricant layer comprising a multidentate lubricant having an anchoring moiety Ra attached to a plurality of sidechain moieties —(Rb—Re) according to the general formula:

$$Ra—(Rb—Re)_x;$$

wherein Ra is a multivalent radical of valance x;

each Rb is, independently, a divalent moiety having the general formula:

$$—OCH_2CF_2O—(CF_2CF_2O)_b—C(R^{\#})_2CH_2OH;$$

wherein each $R^{\#}$ is, independently, a hydrogen or a fluorine atom; each b is, independently from 1 to 10; x is greater than or equal to 2; or x is greater than or equal to 3; and each Re is, independently, a hydroxyl (—OH) or a functional group including elements from Group 13-17 of the periodic table of the elements according to one or more aspects disclosed herein.

In one or more aspects, the average thickness of the lubricant layer of the magnetic recording medium is less than about 3 nanometers, or less than about 2 nm, or less than about 1 nm, or less than or equal to about 0.8 nm. In some aspects, the lubricant of the magnetic recording medium has an average thickness from about 0.3 nm to about 3 nm, or from about 0.3 nm to about 1 nm.

In one or more aspects of the magnetic recording medium, the lubricant has a bonding percentage of at least 70%, or at least 75%, or at least 80%, or at least 85%, corresponding to a degree of bonding of the lubricant to the total area of an upper surface of the protective overcoat.

In one aspect, a magnetic data storage system includes a magnetic head; a magnetic recording medium according to any one or a combination of aspects disclosed herein including a lubricant according to one or more aspects disclosed herein, a drive mechanism for passing the magnetic head over the magnetic recording medium; and a controller electrically coupled to the magnetic head for controlling operation of the magnetic head.

Media Fabrication

Figure 5:
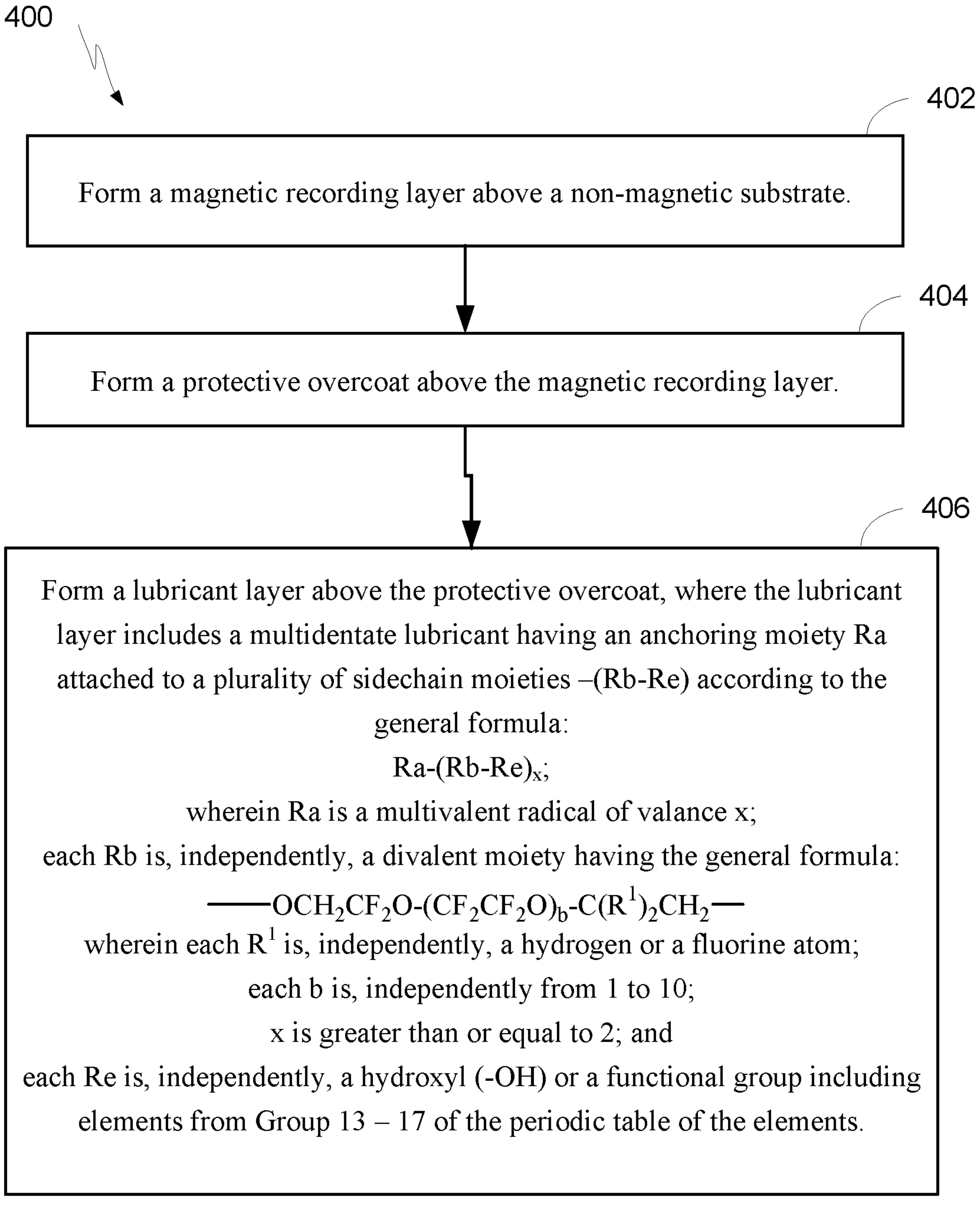
FIG. 5 is a flowchart of a method for forming a magnetic recording medium comprising a lubricant layer thereon, according aspects disclosed herein.

Referring to FIG. 5, a method 400 for forming a magnetic recording medium having a boundary lubricant is shown according to one aspect of the disclosure. As shown in FIG. 5, the method 400 includes forming a magnetic recording layer above a non-magnetic substrate. See operation 402. In various approaches, the method 400 may also include forming other layers positioned between the non-magnetic substrate and the magnetic recording layer. These other layers may include, for example, one or more underlayers, soft underlayers, adhesion layers, etc. (e.g., any of the layers shown in FIG. 3).

As also shown in FIG. 5, the method 400 further includes forming a protective overcoat above the magnetic recording layer and/or forming a capping layer on the magnetic layer and forming a protective overcoat layer on the capping layer. See operation 404. The method 400 further includes forming a lubricant layer on the protective overcoat layer. See operation 406. This lubricant layer may include a multidentate perfluoropolyether boundary lubricant according to one or more aspects disclosed herein, having an anchoring moiety Ra attached to a plurality of sidechain moieties —(Rb—Re) according to the general formula:

$$Ra—(Rb—Re)_x;$$

wherein Ra is a multivalent radical of valance x; each Rb is, independently, a divalent moiety having the general formula:

$$—OCH_2CF_2O—(CF_2CF_2O)_b—C(R^{\#})_2CH_2OH;$$

wherein each $R^{\#}$ is, independently, a hydrogen or a fluorine atom; each b is, independently from 1 to 10; x is greater than or equal to 2; and each Re is, independently, a hydroxyl (—OH) or a functional group including elements from Group 13-17 of the periodic table of the elements.

It is important to note that in alternative approaches, the lubricant layer formed above the protective overcoat may include any of the multidentate perfluoropolyether boundary lubricants described herein, singly and/or in any combination.

In various aspects, the lubricant layer can be formed on the magnetic recording medium, specifically on the protective overcoat, via a dip coating method. For instance, in one aspect the magnetic recording medium may be dipped into a lubricant bath including the multidentate perfluoropolyether boundary lubricant according to one or more aspects of the disclosure and a fluorocarbon solvent such as HFE7100 or Vertrel-XF. After a predetermined amount of time, the magnetic recording medium may be removed from the lubricant bath at a controlled rate. The solvent may then evaporate, leaving behind a lubricant layer comprising the multidentate perfluoropolyether boundary lubricant. The percentage of the multidentate perfluoropolyether boundary lubricants remaining on the surface of the magnetic recording medium after lubrication may be referred to as the bonding percentage. The bonding percentage may be quantified for various time periods by exposing the lubricated magnetic recording medium with the solvent used in the lubricant bath.

The thickness of the lubricant layer may be tuned by controlling the submergence duration of the magnetic recording medium in the lubricant bath, the rate at which the magnetic recording medium is removed from the coating solution, and/or the concentration of the boundary lubricant (e.g. the multidentate perfluoropolyether boundary lubricant according to one or more aspects of the disclosure) in the lubricant bath.

In one or more aspects, the concentration of lubricant in the lubricant bath may be in a range from about 0.1 g/L to about 0.2 g/L. In yet other aspects, the concentration of the lubricant in the lubricant bath may be selected so as to achieve a resulting lubricant layer with a thickness in a range from about less than or equal to about 3 nanometers (nm), or less than or equal to about 2 nm, or less than or equal to about lnm or from 0.3 nm to less than about 1 nm.

It is important to note that formation of the lubricant layer on the surface of the magnetic recording medium, specifically on the surface of the protective overcoat, is not limited to dip coating, but may also involve spin coating, spray coating, a vapor deposition, combinations thereof, or any other suitable coating process as would be understood by one having skill in the art upon reading the present disclosure.

It should be noted that methodology presented herein for at least some of the various aspects may be implemented, in whole or in part, in computer hardware, by hand, using specialty equipment, etc. and combinations thereof.

Moreover, any of the structures and/or steps may be implemented using known materials and/or techniques, as would become apparent to one skilled in the art upon reading the present specification.

In some aspects, the processes herein can perform the sequence of actions as shown in FIG. 5 in a different order. In other aspects, the processes can skip one or more of the actions. In still other aspects, one or more of the actions are performed simultaneously. In some aspects, additional actions can be performed. For example, in one aspect, the process may include any additional actions needed to fabricate the magnetic recording layer structure.

In some aspects, the forming or deposition of such layers can be performed using a variety of deposition sub-processes, including, but not limited to physical vapor deposition (PVD), direct current (DC) sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

The terms "on," "above," "below," and "between" as used herein refer to a relative position of one layer with respect to other layers. As such, one layer deposited or disposed on/above or below another layer may be directly in contact with the other layer or may have one or more intervening layers. Moreover, one layer deposited or disposed between layers may be directly in contact with the layers or may have one or more intervening layers.

Additional Aspects

Having described the various aspects of the disclosure herein, further specific aspects include the examples set forth in the following paragraphs:

A1. A lubricant comprising:

a multidentate lubricant having an anchoring moiety Ra attached to a plurality of sidechain moieties —(Rb—Re) according to the general formula:

$$Ra—(Rb—Re)_x;$$

wherein Ra is a multivalent radical of valance x;

wherein each Rb is, independently, a divalent moiety having the general formula:

$$—OCH_2CF_2O—(CF_2CF_2O)_b—C(R^{\#})_2CH_2OH;$$

wherein each $R^{\#}$ is, independently, a hydrogen or a fluorine atom;

wherein each b is, independently, from 1 to 10;

wherein x is greater than or equal to 2; and wherein each Re is, independently, a hydroxyl (—OH) or a functional group including elements from Group 13-17 of the periodic table of the elements.

A2. The lubricant according to aspect A1, wherein x is greater than or equal to 3.

A3. The lubricant according to aspect A1, wherein x is greater than or equal to 4.

A4. The lubricant according to aspect A1, wherein x is greater than or equal to 5.

A6. The lubricant according to aspect A1, wherein x is greater than or equal to 6.

A7. The lubricant according to any one of aspects A1 through A6, wherein each functional group includes: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, $—NR^*_2$, —NR*—CO—R*, —OR*, —O—CO—R*, —CO—O—R*, —SeR*, —TeR*, $—PR^*_2$, $—PO—(OR^*)_2$, $—O—PO—(OR^*)_2$, $—N{=}P(NR^*_2)_3$, $—AsR^*_2$, —SR*, $—SO_2—(OR^*)_2$, $—BR^*_2$, $—SiR^*_3$, $—(CH_2)q\text{-}SiR^*_3$, $—(CF_2)q\text{-}SiR^*_3$, or a combination thereof; wherein q is 1 to 10 and each R* is, independently a hydrogen, a halogen, a saturated, unsaturated, aromatic, and/or heterocyclic $C_1$-$C_{20}$ radical, and wherein two or more R* may join together to form a ring structure, and wherein at least one functional group is selected to be attachable to a surface of a magnetic recording medium.

A8. The lubricant according to any one of aspects A1 through A7, wherein each Re is a hydroxyl.

A9. The lubricant according to any one of aspects A1 through A8, wherein a weight average molecular weight of two or more of the sidechains —(Rb—Re) are equal.

A10. The lubricant according to any one of aspects A1 through A9, wherein each of the sidechains —(Rb—Re) are chemically identical.

A11. The lubricant according to any one of aspects A1 through A10, wherein Ra is a $C_1$-$C_{20}$ radical, an unsaturated $C_1$-$C_{20}$ radical, an alicyclic $C_3$-$C_{20}$ radical, a heterocyclic $C_2$-$C_{20}$ radical, an aromatic $C_6$-$C_{20}$ radical, a heteroaromatic $C_5$-$C_{20}$ radical, a cyclo-triphosphazine radical, or a combination thereof, and wherein x is greater than or equal to 3.

A12. The lubricant according to any one of aspects A1 through A11, having the general formula:

$$R_a—(O—CH_2CF_2O(CF_2CF_2O)_b—CF_2CH_2OH)_x$$

wherein each b is, independently from 1 to 10 and x greater than or equal to 3.

A13. The lubricant according to any one of aspects A1 through A11, having the general formula:

$$R_a\text{—}(O\text{—}CH_2CF_2O(CF_2CF_2O)_b\text{—}CF_2CH_2OH)_x$$

wherein each b is, independently, from 1 to 10 and x greater than or equal to 3.

A14. The lubricant according to any one of aspects A1 through A13, wherein $R_a$ is represented by the formula:

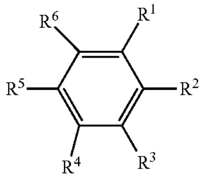

wherein each of $R^1$, $R^2$, $R^3$, $R^4$, $R^5$, and $R^6$, is, independently, a hydrogen or a functional group including elements from Group 13-17 of the periodic table of the elements, subject to the proviso that two or more of $R^1$, $R^2$, $R^3$, $R^4$, $R^5$, and $R^6$, are, independently, a sidechain having the formula —(Rb—Re).

A15. The lubricant according to aspect A14, wherein two or more of $R^1$, $R^2$, $R^3$, $R^4$, $R^5$, and $R^6$, include a functional group including: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, —$NR_2$, —NR*—CO—R*, —OR*, —O—CO—R*, —CO—O—R*, —SeR*, —TeR*, —$PR^*_2$, —PO—$(OR^*)_2$, —O—PO—$(OR^*)_2$, —N=$P(NR^*_2)_3$, —$AsR^*_2$, —SR*, —$SO_2$—$(OR^*)_2$, —$BR^*_2$, —$SiR^*_3$, —$(CH_2)$q-$SiR^*_3$, —$(CF_2)$q-$SiR^*_3$, or a combination thereof, wherein q is 1 to 10 and each R* is, independently a hydrogen, a halogen, a saturated, unsaturated, aromatic, and/or heterocyclic $C_1$-$C_{20}$ radical, and wherein two or more R*, and/or two or more of $R^1$, $R^2$, $R^3$, $R^4$, $R^5$, and $R^6$, may join together to form a ring structure, and wherein at least one functional group is selected to be attachable to a surface of a magnetic recording medium.

A16. The lubricant according to aspect A14 or A15, wherein two or more of $R^1$, $R^2$, $R^3$, $R^4$, $R^5$, and $R^6$ join together to form an alicyclic $C_3$-$C_{20}$ ring structure, a heterocyclic $C_3$-$C_{20}$ ring structure, a $C_5$-$C_{20}$ aromatic ring structure, a $C_5$-$C_{20}$ heteroaromatic ring structure, or a combination thereof.

A17. The lubricant according to aspect A14 or A15, wherein two or more of $R^1$, $R^2$, $R^3$, $R^4$, $R^5$, and $R^6$, join together to form an alicyclic $C_3$-$C_{20}$ ring structure, a heterocyclic $C_3$-$C_{20}$ ring structure, an aromatic $C_5$-$C_{20}$ radical, a heteroaromatic $C_5$-$C_{20}$ radical, or a combination thereof, which is further substituted with one or more sidechains having the formula —(Rb—Re).

A18. The lubricant according to any one of aspects A14 through A17, wherein each of the sidechains independently has the formula:

$$\text{—}OCH_2CF_2O\text{—}(CF_2CF_2O)_b\text{—}C(R^\#)_2CH_2OH;$$

wherein each $R^\#$ is, independently, a hydrogen or a fluorine atom; and each b is, independently from 1 to 10.

A19. The lubricant according to any one of aspects A14 through A18, wherein each $R^\#$ is hydrogen.

A20. The lubricant according to any one of aspects A1 through A13, wherein $R_a$ is represented by the formula:

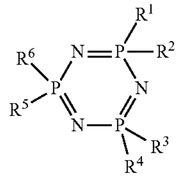

wherein each of $R^1$, $R^2$, $R^3$, $R^4$, $R^5$, and $R^6$, is, independently, a hydrogen or a functional group including elements from Group 13-17 of the periodic table of the elements, subject to the proviso that three or more of $R^1$, $R^2$, $R^3$, $R^4$, $R^5$, and $R^6$, are, independently, a sidechain having the formula —(Rb—Re).

A21. The lubricant according to aspect A20, wherein each of the sidechains independently has the formula:

$$\text{—}OCH_2CF_2O\text{—}(CF_2CF_2O)_b\text{—}C(R^\#)_2CH_2OH;$$

wherein each $R^\#$ is, independently, a hydrogen or a fluorine atom; and each b is, independently from 1 to 10.

A22. The lubricant according to any one of aspects A1 through A21, having a weight average molecular weight from about 1 to 20 kiloDaltons (kDa) and a polydispersity of from about 1 to 2.

A23. A magnetic recording medium, comprising:

a magnetic recording layer positioned on a non-magnetic substrate;

a protective overcoat positioned on the magnetic recording layer; and a lubricant layer on the protective overcoat comprising the lubricant according to any one of aspects A1 through A22.

A24. The magnetic recording medium according to aspect A23, wherein the lubricant layer includes an average thickness of less than about 3 nanometers.

A25. The magnetic recording medium according to aspect A23 or A24, wherein the lubricant includes a bonding percentage of at least 70%, based on the total area of an upper surface of the protective overcoat.

A26. A data storage system, comprising:

at least one magnetic head;

the magnetic recording medium according to any one of aspects A23 through A25;

a drive mechanism for positioning the at least one magnetic head on the magnetic recording medium; and a controller electrically coupled to the at least one magnetic head for controlling operation of the at least one magnetic head.

The above description is made for the purpose of illustrating the general principles of the present disclosure and is not meant to limit the inventive concepts claimed herein. Further, particular features described herein can be used in combination with other described features in each of the various possible combinations and permutations.

It should be noted that in the development of any such actual aspect, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device, system and/or method used/disclosed herein can also comprise some components other than those cited.

Unless otherwise specifically defined herein, all terms are to be given their broadest possible interpretation including meanings implied from the specification as well as meanings understood by those skilled in the art and/or as defined in dictionaries, treatises, and the like.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 angstroms (Å) refers to a thickness of 10 Å+/−1 Å, e.g., from 0.9 Å to 1.1 Å in this example.

In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at."" The term "and/or" refers to both the inclusive "and" case and the exclusive "or" case, and such term is used herein for brevity. For example, a composition comprising "A and/or B" may comprise A alone, B alone, or both A and B.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is directly on another component and/or in another component (e.g., directly on a surface of a component or embedded in a component). Thus, for example, a first component that is over the second component may mean that (1) the first component is over the second component, but not directly touching the second component, (2) the first component is directly on (e.g., directly on a surface of) the second component, and/or (3) the first component is in (e.g., embedded in) the second component. The term "about 'value X'", or "approximately value X," as used in the disclosure shall mean within 10 percent of the 'value X'. For example, a value of about 1 or approximately 1 would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X," with the meaning noted above.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. A lubricant comprising:

a multidentate lubricant comprising an anchoring moiety Ra attached to a plurality of sidechain moieties —($R_b$-$R_e$) according to a general formula:

$$R_a\text{-}(R_b\text{-}R_e)_x;$$

wherein $R_a$ is a multivalent radical of valence x;

wherein each $R_b$ is, independently, a divalent moiety comprising the general formula:

$$\text{—}OCH_2CF_2O\text{—}(CF_2CF_2O)_b\text{—}C(R^\#)_2CH_2\text{—};$$

wherein each $R^\#$ is a hydrogen atom;

wherein each b is, independently, from 1 to 10;

wherein x is greater than or equal to 2; and wherein each $R_e$ is a hydroxyl (—OH).

2. The lubricant of claim 1, wherein a weight average molecular weight of two or more of the sidechains —($R_b$-$R_e$) is equal.

3. The lubricant of claim 1, wherein each of the sidechains —($R_b$-$R_e$) is chemically identical.

4. The lubricant of claim 1, wherein $R_a$ is a $C_1$-$C_{20}$ radical, an unsaturated $C_1$-$C_{20}$ radical, an alicyclic $C_3$-$C_{20}$ radical, a heterocyclic $C_2$-$C_{20}$ radical, an aromatic $C_6$-$C_{20}$ radical, a heteroaromatic $C_5$-$C_{20}$ radical, a cyclo-triphosphazine radical, or a combination thereof, and wherein x is greater than or equal to 3.

5. The lubricant of claim 1, comprising the general formula:

$$R_a\text{-}(O—CH_2CF_2O(CF_2CF_2O)_b—CF_2CH_2OH)_x$$

wherein each b is, independently, from 1 to 10 and x greater than or equal to 3.

6. The lubricant of claim 1, wherein $R_a$ is represented by the formula:

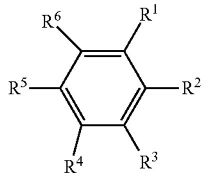

wherein each of $R^1$, $R^2$, $R^3$, $R^4$, $R^5$, and $R^6$, is, independently, a hydrogen or a functional group including elements from Group 13-17 of the periodic table of the elements, subject to the proviso that two or more of $R^1$, $R^2$, $R^3$, $R^4$, $R^5$, and $R^6$, are, independently, a sidechain comprising the formula —($R_b$-$R_e$).

7. The lubricant of claim 6, wherein two or more of $R^1$, $R^2$, $R^3$, $R^4$, $R^5$, and $R^6$, include a functional group including: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, $—NR^*_2$, $—NR^*—CO—R^*$, $—OR^*$, $—O—CO—R^*$, $—CO—O—R^*$, $—SeR^*$, $—TeR^*$, $—PR^*_2$, $—PO—(OR^*)_2$, $—O—PO—(OR^*)_2$, $—N{=}P(NR^*_2)_3$, $—AsR^*_2$, $—SR^*$, $—SO_2—(OR^*)_2$, $—BR^*_2$, $—SiR^*_3$, $—(CH_2)q\text{-}SiR^*_3$, $—(CF_2)q\text{-}SiR^*_3$, or a combination thereof, wherein q is 1 to 10 and each R* is, independently a hydrogen, a halogen, a saturated, unsaturated, aromatic, and/or heterocyclic $C_1$-$C_{20}$ radical, and wherein two or more R*, and/or two or more of $R^1$, $R^2$, $R^3$, $R^4$, $R^5$, and $R^6$, may join together to form a ring structure, and wherein at least one functional group is selected to be attachable to a surface of a magnetic recording medium.

8. The lubricant of claim 6, wherein two or more of $R^1$, $R^2$, $R^3$, $R^4$, $R^5$, and $R^6$ join together to form a $C_5$-$C_{20}$ aromatic ring structure, a $C_5$-$C_{20}$ heteroaromatic ring structure, or a combination thereof.

9. The lubricant of claim 6, wherein each of the sidechains independently has the formula:

$$—OCH_2CF_2O—(CF_2CF_2O)_b—C(R^\#)_2CH_2—;$$

wherein each $R^\#$ is a hydrogen atom; and wherein each b is, independently, from 1 to 10.

10. The lubricant of claim 1, wherein $R_a$ is represented by the formula:

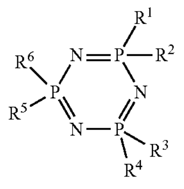

wherein each of $R^1$, $R^2$, $R^3$, $R^4$, $R^5$, and $R^6$, is, independently, a hydrogen or a functional group including elements from Group 13-17 of the periodic table of the elements, subject to the proviso that three or more of $R^1$, $R^2$, $R^3$, $R^4$, $R^5$, and $R^6$, are, independently, a sidechain comprising the formula —($R_b$-$R_e$).

11. The lubricant of claim 10, wherein each of the sidechains independently has the formula:

$$—OCH_2CF_2O—(CF_2CF_2O)_b—C(R^\#)_2CH_2—;$$

wherein each $R^\#$ is, independently, a hydrogen or a fluorine atom; and wherein each b is, independently, from 1 to 10.

12. The lubricant of claim 1, comprising a weight average molecular weight from about 1 to 20 kiloDaltons (kDa) and a polydispersity of from about 1 to 2.

13. A magnetic recording medium, comprising:

a magnetic recording layer on a substrate;

a protective overcoat on the magnetic recording layer; and a lubricant layer on the protective overcoat and including the lubricant according to claim 1.

14. The magnetic recording medium of claim 13, wherein the lubricant layer includes an average thickness of less than about 3 nanometers.

15. The magnetic recording medium of claim 13, wherein the lubricant includes a bonding percentage of at least 70%, corresponding to a degree of bonding of the lubricant to the total area of an upper surface of the protective overcoat.

16. A data storage system, comprising:

at least one magnetic head;

a magnetic recording medium including a lubricant according to claim 1;

a drive mechanism for positioning the at least one magnetic head over the magnetic recording medium; and a controller electrically coupled to the at least one magnetic head for controlling operation of the at least one magnetic head.

17. A data storage system, comprising:

a slider comprising at least one magnetic head and an air bearing surface (ABS), wherein a lubricant according to claim 1 is disposed on the ABS; and a magnetic recording medium including a magnetic recording layer;

wherein the slider is configured to write information to the magnetic recording layer using heat assisted magnetic recording (HAMR).

18. A lubricant comprising:

a multidentate lubricant comprising an anchoring moiety $R_a$ attached to a plurality of sidechain moieties —($R_b$-$R_e$) according to a general formula:

$$R_a\text{-}(R_b\text{-}R_e)_x;$$

wherein $R_a$ is a multivalent radical of valence x represented by the formula:

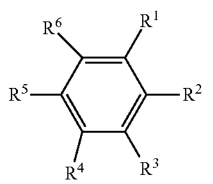

wherein each of $R^1$, $R^2$, $R^3$, $R^4$, $R^5$, and $R^6$, is, independently, a hydrogen or a functional group comprising a sidechain comprising a formula —($R_b$-$R_e$) with the proviso that two or more of $R^1$, $R^2$, $R^3$, $R^4$, $R^5$, and $R^6$, are, independently, the sidechain having the formula $—(R_b\text{-}R_e)$;

wherein each $R_b$ is, independently, a divalent moiety comprising a general formula:

$$—OCH_2CF_2O—(CF_2CF_2O)_b—C(R^{\#})_2CH_2—;$$

wherein each $R^{\#}$ is, independently, a hydrogen or a fluorine atom;

wherein each b is, independently, from 1 to 10;

wherein x is greater than or equal to 2; and wherein each $R_e$ is, independently, a hydroxyl (—OH) or a functional group including elements from periodic table Groups 13-17.

19. The lubricant of claim 18, wherein each $R^{\#}$ is a hydrogen atom and each $R_e$ is a hydroxyl (—OH) functional group.

20. The lubricant of claim 19, wherein x is greater than or equal to 3.

* * * * *